(12) United States Patent
Jüngst

(10) Patent No.: US 6,449,587 B1
(45) Date of Patent: Sep. 10, 2002

(54) PROCESS FOR THE AUTOMATIC MACHINE PRODUCTION OF ENGINEERING DATA

(75) Inventor: Ernst-Werner Jüngst, Berlin (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/242,381

(22) PCT Filed: Aug. 14, 1997

(86) PCT No.: PCT/EP97/04441
§ 371 (c)(1),
(2), (4) Date: Feb. 12, 1999

(87) PCT Pub. No.: WO98/08173
PCT Pub. Date: Feb. 26, 1998

(30) Foreign Application Priority Data

Aug. 16, 1996 (DE) ......................................... 196 33 870

(51) Int. Cl.⁷ ............................................... G06F 17/50
(52) U.S. Cl. ........................... 703/1; 700/97; 700/182; 706/919; 707/502; 345/964
(58) Field of Search .................. 703/1, 2, 22; 700/182, 700/97, 98; 706/919; 345/964; 707/502

(56) References Cited

U.S. PATENT DOCUMENTS

| | | | | |
|---|---|---|---|---|
| 5,856,924 A | * | 1/1999 | Brost et al. .................. | 700/182 |
| 5,923,573 A | * | 7/1999 | Hatanaka ........................ | 703/2 |
| 6,224,249 B1 | * | 5/2001 | Ozawa et al. .................... | 703/1 |
| 6,249,714 B1 | * | 6/2001 | Hocaoglu et al. .............. | 700/97 |
| 6,256,595 B1 | * | 7/2001 | Schwalb et al. ................ | 703/1 |

FOREIGN PATENT DOCUMENTS

DE 30 43 563 C2 6/1982

OTHER PUBLICATIONS

Perrard et al., C. Design of Flexible Assembly Systems: Extension of the Conceptual Diagrams to the Modeling of Multi-Product Manufacturing, International Conference on Systems, Man and Cybernetics, 1993, Systems Engineering in the Service of Conference.*
Rifkin, S. When the project absolutely must get done: Marrying the organization chart with the precedence diagram, Proceedings of the 2000 International Conference on Software Engineering, 2000, pp. 588–596.*

(List continued on next page.)

*Primary Examiner*—Russell Frejd
(74) *Attorney, Agent, or Firm*—McGlew and Tuttle, P.C.

(57) ABSTRACT

A process, in which the original master diagram, which is used as the generic representation of the variation spectrum of the product and in which at least one symbol corresponds to every possible component of the product, is stored in the coded form in the memory of the information processing unit, is disclosed for the computerized generation of engineering data for products that are assembled according to individual specifications of the components. The conditions for the presence of components or of operating materials of components in an expression of the product that meets the specification are stored in the memory such that they are associated with the symbols of the original master diagram that correspond to the component or to an operating material of the component. A target engineering diagram is generated according to this process by performing a check for all symbols of the original master diagram based on the values of the specification to determine whether the corresponding conditions are met, and a decision is made based on the result of the checking (or depending on this and other factors) on whether the symbol will be taken over into the target engineering diagram (and if and when it will be taken over, how). The target engineering diagram is used as the engineering data.

17 Claims, 1 Drawing Sheet

OTHER PUBLICATIONS

Heirich et al.,M. A Resource–Based Paradigm for the Configuring of Technical Systems from Modular Components, Seventh IEEE Conference on Artificial Intelligence for Aplications, 1991, pp. 257–264.*

H. Ehrig et al., 1989, Graph Grammars and Their Application to Computer Science. Lecture Notes in Computer Science.

C. L. Forgy, 1982, A Fast Alogorithm foR the Many pattern/Many Object Pattern Match Problem, Artifical Intelligence.

M. H. Berlin, 1989, Expertensystem zur Schaltplanerstellung, Autumatisierungstech nische Praxis.

M. May, May 8, 1990 Uber Das Layout Netzartiger Schemata.

* cited by examiner

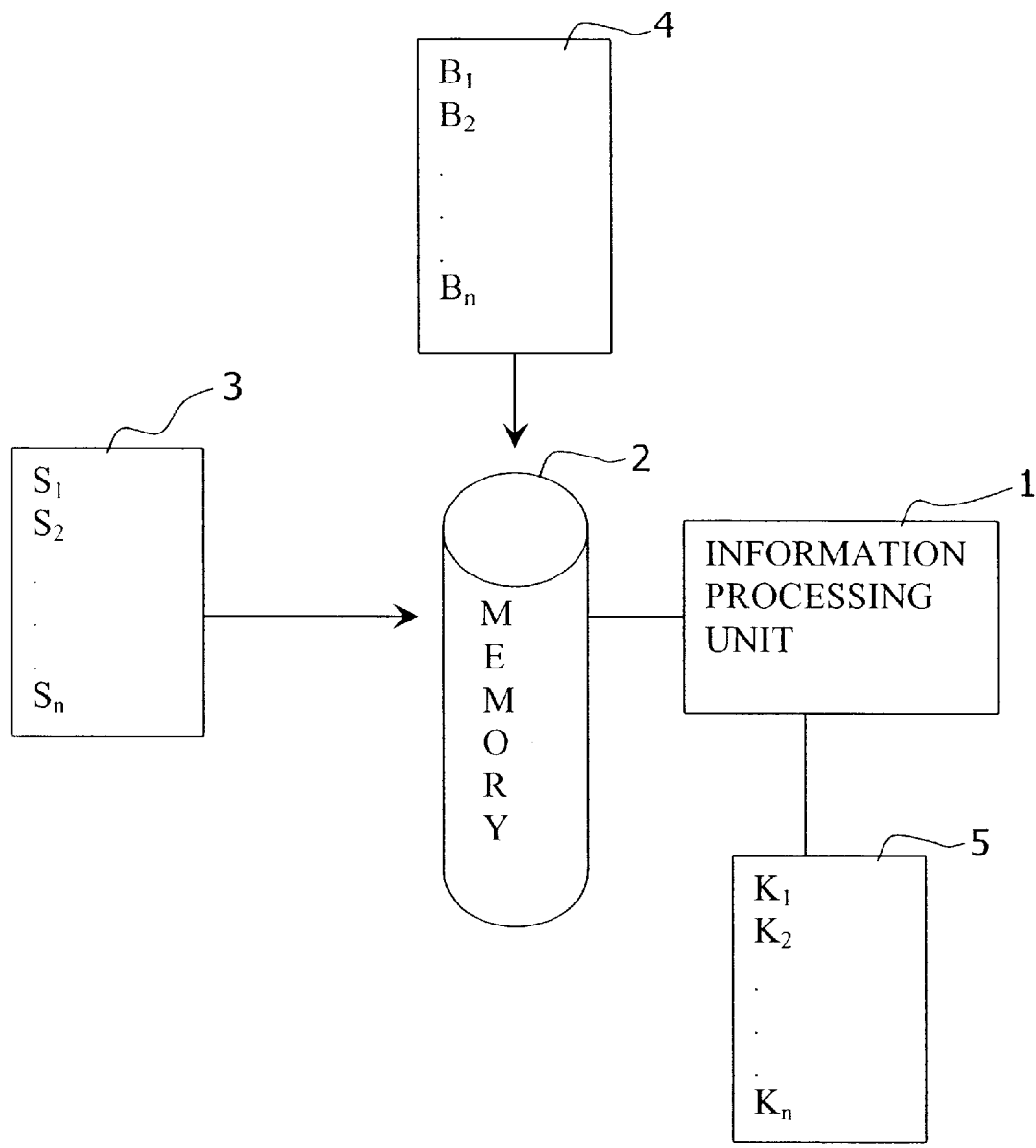

PROCESS FOR THE AUTOMATIC MACHINE PRODUCTION OF ENGINEERING DATA

FIELD OF THE INVENTION

In the industrial manufacture of products that are assembled from components according to individual specifications, the generation of the specific engineering data for each of the individually specified products is an essential process step. The information processing involved in this process step has been hitherto performed almost exclusively by humans, as a result of which this process step is time-consuming, expensive and error-prone.

BACKGROUND OF THE INVENTION

A theoretical possibility of converting graphs (graph grammars), in which a predetermined set of transformation rules is applied once or repeatedly to a root node of the graph and a complex graph is generated therefrom, has been known from the literature (e.g., Ehrig et al.: Graph Grammars and Their Application to Computer Sciences, *Springer Lecture Notes* CS 291, 1986). In an analogous extrapolation of this process to the area of engineering diagrams, the original master diagram could be converted into a target engineering diagram by the application of a set of rules, which act in the same way for all similar symbols and for identical symbol constellations. A conversion in which two identical symbols or symbol constellations are treated individually differently depending on external data during the transfer into the target engineering diagram is thus not possible.

Furthermore, programs and processes for putting together macrosymbols into engineering diagrams by means of rules on the basis of specification data have been known from the literature (e.g., M. Heinrich: Expert System for the Preparation of Circuit Diagrams, *Automatisierungstechnische Praxis* atp, Vol. 31 (1989), No. 4, pp. 190–195). However, the processes have the serious drawback that the macrosymbols must be drafted in advance and the formal and factual correctness of the engineering diagrams possibly generated during the fitting together of the macrosymbols must be ensured in advance, because the information in the macrosymbol and their connection network structure and their external connectability are not known to the rule evaluation engine and cannot be deducted. This makes decisively more difficult and increases signficantly the cost for creating and maintaining the knwoledge base and for generating the target engineering diagram.

Furthermore, various processes for determining values for variables by means of rules on the basis of data have been known from the literature (e.g., C. L. Forgy: Rete: A fast algorithm for the many pattern/many object pattern match problem, *Artificial Intelligence*, Vol. 19 (1982), No. 1, pp. 17–37) and from patents (e.g., DE P 30 43 563.3-53). One theoretically possible process for generating engineering data now consists of determining the components of the product on the basis of the specification by evaluating a set of rules and of subsequently determining the symbols of the components and/or their operational units from this parts list and of generating the engineering data by spatial arrangement processes known from the literature (e.g., M. May: *Über das Layout netzartiger Systeme* [Layout of Network-like Systems], Postdoctoral Thesis, Akad. d. Wiss. der DDR,. Berlin, 1990). The process requires the setting up of general rules for designing graphs on the basis of the components. Such processes rarely attain an attractive appearance, because the effect of the placement rules is difficult to predict, and the human expert who specifies the basic knowledge has no possibility of expressing his graphic design wishes.

SUMMARY AND OBJECTS OF THE INVENTION

The primary object of the present invention is to accomplish the task of automatically generating by computer such engineering diagrams, which control the manufacturing process of the individualized product, on the basis of specification data and on the basis of the basic knowledge about the individual products that can be theoretically manufactured within a product class, in a process that can be carried out by computer, and to show how the basic knowledge is expediently represented in the memory of the information processing unit carrying out the process. The human expert formulating the basic knowledge shall now be able to determine the graphic design of the engineering data, and the problems of knowledge representation and knowledge management, which occur in the prior-art processes, shall be avoided.

This object is accomplished according to the present invention by an original master diagram being stored in a coded form in a memory of the information processing unit, which is used as the generic representation of the variation spectrum of the product, wherein at least one symbol $S_i$ in the original master diagram corresponds to every possible component $K_i$, by a coding of the condition $B_i$, which specifies the presence of the component or of the indicated operational units of the component $K_i$ in an instantization/instance of the product that satisfies the specification, being stored in a memory of the information processing unit for each symbol $S_i$, which corresponds to the component or to the indicated operational units of the component $K_i$, by the memories being provided such that values or the attributes of the specification of the product, which attributes are included in the condition, are able to be determined from the coding of a condition $B_i$ directly or indirectly, and by a target engineering diagram $Z_x$ being generated as specific manufacturing data for the product $P_x$ to be manufactured according to the specification X from the original master diagram by performing a check for all symbols $S_j$ of the original master diagram, for which a condition is contained in the memory, by the computerized evaluation of the associated condition $B_j$, using the values of the attributes of the specification, to determine whether the condition $B_j$ is met, and the symbol $S_j$ is taken over into the target engineering diagram $Z_x$ only if the condition $B_j$ is met.

The various features of novelty which characterize the invention are pointed out in particular in the claims annexed to and forming a part of this disclosure. For a better understanding of the invention, its operating advantages and specific objects attained by its uses, reference is made to the accompanying descriptive matter in which a preferred embodiment of the invention is discussed.

DESCRIPTION OF THE PREFERRED EMBODIMENT

The invention comprises a process for the automatic, computerized generation of specific engineering data for a product to be assembled from components on the basis of attributes of the specification of the product. The attributes are stored in a memory of an information processing unit. A generic representation of the variation spectrum of the product is stored in the memory of the information processing unit. An original master diagram is used as a generic representation of the variation spectrum of the product. This key plan is stored in a coded form in a memory of the information processing unit. At least one symbol $S_i$ in the original master diagram corresponds to every possible component $K_i$ of the product. A condition $B_i$, which specifies the presence of the component or of the indicated operational unit of the component $K_i$ in an instantiation/instance of the product that satisfies the specification, is coded and is stored in a memory of the information processing unit for each symbol $S_i$ that corresponds to the component or to the indicated operational unit of the component $K_i$. The memories are provided such that the values of the attributes of the specification of the product, which values are included in the condition, are determined from the coding of each condition $B_i$ directly or indirectly. A target engineering diagram $Z_x$ is subsequently generated as specific engineering data for the product $P_x$ to be manufactured. This target engineering diagram $Z_x$ is generated according to the specification from the original master diagram by performing a check for all symbols $S_j$ of the original master diagram, for which a condition is contained in the memory. This is done by the computerized evaluation of the associated condition $B_j$, using the values of the attributes of the specification, to determine whether the condition $B_j$, is met, and the symbol $S_j$ is taken up in the target engineering diagram $Z_x$ only if the condition $B_j$ is met.

Due to the use of the master diagrams and the connections between components, which are already represented in the master diagrams graphically, it is not necessary to explicitly describe by rules the connections between components, which are necessary depending on the specification. Such a rule description was necessary in the prior art and led to a considerable conceptual and manual effort. Instead, the connections arise, in contrast, automatically in the process according to the present invention from the connection structure of the symbols in the generic (master) diagram during the computerized evaluation corresponding to the embodiments of the present invention as described below.

In one embodiment, a graphic chart, which can be interpreted as a flow chart, e.g., a circuit diagram, a signal flow chart or a process flow chart, is used as the original master diagram. The connection points the symbol has are stored in the memory of the information processing unit for each symbol individually or in the type of the symbol. The information on whether the symbol is connected to other symbols is stored in the coding of the original master diagram, which coding is contained in the memory. Before a symbol $S_j$ is taken over into the target engineering diagram, a check is performed by a computer (the information processing unit) to determine whether a target engineering diagram in which the symbol $S_j$ would be unconnected at least at one connection point would be generated by not taking over one or more other symbols directly or indirectly connected to the symbol $S_j$ in the original master diagram, and the symbol $S_j$ is not taken over into the target engineering diagram in this case.

In the evaluation based on the data of the specification, the condition $B_i$ associated with a symbol $S_i$ in the original master diagram determines whether the symbol $S_i$ will be taken over into the target engineering diagram or whether it will be omitted in the target engineering diagram, or, this depends on the type of the symbol $S_i$ whether it will be replaced with another symbol, e.g., a neutral connection symbol.

Symbols in the original master diagram, for which the computerized evaluation of the conditions of these and/or other symbols in the original master diagram reveals that they would be connected in parallel to the target engineering diagram individually or as a serially connected group to an individual neutral connection symbol or to a serially connected group of neutral connection symbols, are not taken over into the target engineering diagram.

Symbols in the original master diagram, for which the computerized evaluation of the conditions of these and/or other symbols in the original master diagram reveals that they would be bridged in the target engineering diagram with neutral connection symbols and would form a serially connected group, are replaced with an individual neutral connection symbol.

The generation of the target engineering diagram may be accompanied with computerized process steps, by which the original master diagram is converted, once or if needed, into a machine-readable form, in which each group of symbols that is coherent due to connections is translated into a system of Boolean expressions. The terms of the Boolean expressions contain the conditions associated with the symbols, and serially connected symbols or symbol groups are translated by AND'ing or translated into an AND operation on, corresponding terms, and parallel-connected symbols or symbol groups are translated by OR'ing translated into an OR operation on, the corresponding terms. These Boolean expressions are partially evaluated by computer by inserting the values for the variables in the conditions and by a systematic simplification of the Boolean expressions. The remaining nontrivial Boolean expressions are retranslated into a corresponding target engineering diagram.

The generation of the target engineering diagram may be accomplished with computerized process steps, by which the original master diagram is translated by computer, once or whenever needed, into a graph, whose links correspond to a symbol each. If necessary, repeated determinations are made by computer according to the data of the specification and the condition associated with the symbol of each link to determine whether a link is eliminated or not, and whether the two nodes connected by the link are identified with one another or not or whether nodes with exactly one afferent link and one efferent link are omitted, the two links being integrated into a single link. The remaining nontrivial partial graphs are retranslated into corresponding symbol arrangements for the target engineering diagram.

While specific embodiments of the invention have been shown and described in detail to illustrate the application of the principles of the invention, it will be understood that the invention may be embodied otherwise without departing from such principles.

What is claimed is:

1. A process for the computerized generation of specific engineering diagrams for a product to be assembled from components on the basis of attributes of the specification of the product, the process comprising the steps of:

providing an original master diagram with a generic representation of the variation spectrum of the product wherein at least one symbol $S_i$ in the original master diagram corresponds to every possible component $K_i$;

storing the original master diagram in a computer readable memory of an information processing unit;

providing a condition $B_i$ for each symbol $S_i$ specifying the presence of the component $K_i$ or of an indicated operational unit of the component $K_i$ in an instance of the product that satisfies the specification;

storing each condition $B_i$ in the memory of the information processing unit for each symbol $S_j$;

determining the values of the attributes of the specification of the product from the conditions $B_i$ from the memories, the values of the attributes being included in the conditions $B_i$; and generating a target engineering diagram $Z_x$ as specific engineering data for the product $P_x$ to be manufactured according to the specification from the original master diagram by performing a check for all symbols $S_j$ of the original master diagram, for which a condition is contained in the memory, by a computerized evaluation of the associated condition $B_j$, using the values of the attributes of the specification, to determine whether the condition $B_j$ is met; and entering the symbol $S_j$ in the target engineering diagram $Z_x$ only if the condition $B_j$ is met.

2. The process in accordance with claim 1, wherein:

each symbol has connection points stored in the memory of the information processing unit individually or as a symbol type;

the information on whether the symbol is connected to other symbols is stored in the original master diagram in the memory;

before a symbol $S_j$ is taken over into the target engineering diagram, using the information processor to determine whether the symbol $S_j$ would be unconnected at least at one connection point by not also taking over into the target engineering diagram one or more other symbols directly or indirectly connected to the symbol $S_j$ in the original master diagram; and not taking over the symbol $S_j$ into the target engineering diagram if it is determined that the symbol $S_j$ would be unconnected at least at one connection point by not also taking over one or more other symbols directly or indirectly connected to the symbol $S_j$ in the original master diagram.

3. The process in accordance with claim 1, wherein said step of determining the values of the attributes of the specification of the product from the conditions $B_i$ from the memories determines whether the symbol $S_i$ will be taken over into the target engineering diagram or whether it will be omitted in the target master diagram, or, depending on the type of the symbol $S_i$ whether it will be replaced with another symbol.

4. The process in accordance with claim 3, wherein the another symbol is a neutral connection symbol providing a connection between two symbols.

5. The process in accordance with claim 4, wherein the information processing unit evaluates symbols in the original master diagram and does not enter a symbol in the target engineering diagram $Z_x$ where the symbol is connected to another symbol in the target engineering diagram by an individual said neutral connection symbol or by a serially connected group of neutral connection symbols.

6. The process in accordance with claim 1, wherein the information processing unit evaluates symbols in the original master diagram for symbols that would be replaced in the in the target engineering diagram with a neutral connection symbols and would form a serially connected group, are replaces these with an individual neutral connection symbol.

7. The process in accordance with claim 1, wherein the generation of the target engineering diagram comprises computerized process steps, including:

converting the data in memory comprising the original master diagram once or whenever needed into a machine-readable form, in which each group of symbols that is coherent due to connections, is translated into a system of Boolean expressions, wherein the terms of the Boolean expressions contain the conditions associated with the symbols, and serially connected symbols or symbol groups are translated by AND linkage of the corresponding terms, and parallel-connected symbols or symbol groups are translated by OR linkage of the corresponding terms;

said Boolean expressions are partially evaluated by a processor by substituting the values for the variables in the conditions and systematically simplifying the Boolean expressions; and the remaining nontrivial Boolean expressions are retranslated into a corresponding target engineering diagram.

8. The process in accordance with claim 1, wherein the generation of the target engineering diagram comprises computerized process steps, by which the original master diagram is translated by a processor, once or whenever needed, into a graph, whose links each correspond to a symbol;

if necessary, repeated determinations are made by computer according to the data of the specification and the condition associated with the symbol of each link to determine whether a link is eliminated or not and whether the two nodes connected by the link are identified with one another or not or whether nodes with exactly one afferent link and one efferent link are omitted, the two links being integrated into a single link; and the remaining nontrivial partial graphs are retranslated into corresponding symbol arrangements for the target engineering diagram.

9. The process in accordance with claim 2, wherein said step of determining the values of the attributes of the specification of the product from the conditions $B_i$ from the memories, determines whether the symbol $S_i$ will be taken over into the target master diagram or whether it will be omitted in the target master diagram or whether it will be replaced with another symbol, depending on the type of the symbol $S_i$.

10. A process for the computerized generation of specific engineering diagrams from components on the basis of attributes of the specification of the product, the process comprising the steps of:

providing an original master diagram in a memory, the original master diagram comprising a generic representation of the variations of all of the product components, the master diagram including symbols with each symbol corresponding to one possible component;

providing a condition in memory for each of said symbols corresponding to components that satisfy the specification or corresponding to operational unit of the components $K_i$ that satisfy the specification;

using a processor to determine, by evaluation of the associated condition, whether each symbol in the original master diagram in the memory will be taken over into the target engineering diagram or whether it will be omitted in the target master diagram or whether it will be replaced with another symbol, using the values of the attributes of the specification, to determine whether the condition for each symbol is met; and entering the symbols in the target engineering diagram for which the condition is met.

11. The process in accordance with claim 10, wherein:
  each symbol has connection points stored in the memory, the connection points being one of individual connection points for a particular symbol or group connection points for a group of symbols;
  the information on whether the symbol is connected to other symbols is stored in the original master diagram in the memory;
  said step of using a processor to determine whether each symbol in the original master diagram in the memory will be taken over into the target engineering diagram or whether it will be omitted in the target master diagram or whether it will be replaced includes using the information processor to determine whether a particular symbol would be unconnected at least at one connection point if one or more other symbol that is directly or indirectly connected to the particular symbol in the master diagram omitted in the target master diagram and omitting the particular symbol from the target master diagram if the processor determines that the symbol would be unconnected by not also taking over the other symbol or symbols.

12. The process in accordance with claim 10, wherein the step of using the processor comprises:
  converting the data in memory comprising the original master diagram into a form in which each group of symbols that is coherent due to connections, is translated into a system of Boolean expressions, wherein the terms of the Boolean expressions contain the conditions associated with the symbols, and serially connected symbols or symbol groups are translated by AND linkage of the corresponding terms, and parallel-connected symbols or symbol groups are translated by OR linkage of the corresponding terms;
  partially evaluation said Boolean expressions by the processor by substituting the values for the variables in the conditions and systematically simplifying the Boolean expressions; and
  retranslating the remaining nontrivial Boolean expressions into a corresponding target engineering diagram.

13. The process in accordance with claim 10, wherein the step of using the processor comprises:
  translating the original master diagram into a graph, with links corresponding to each symbol;
  determining whether a link is eliminated or not and whether the two nodes connected by the link are identified with one another or not or whether nodes with exactly one information accepting link and one information providing link are omitted, the two links being integrated into a single link; and
  the remaining nontrivial partial graphs are retranslated into corresponding symbol arrangements for the target engineering diagram.

14. The process in accordance with claim 10, wherein when a symbol is not taken over into the target engineering diagram from the original master diagram or replaced by another symbol from the original master diagram, a neutral symbol providing a connection function is taken over into target engineering diagram to provide connection between at least two symbols take over into target engineering diagram.

15. A process for the computerized generation of specific engineering diagrams from components on the basis of attributes of the specification of the product, the process comprising the steps of:
  providing an original master diagram in a memory, the original master diagram comprising a generic representation of the variations of all of the product components, the original master diagram including symbols with each symbol corresponding to one possible component, each symbol having connection points stored in the memory, the connection points being one of individual connection points for a particular symbol or group connection points for a group of symbols, said original master diagram further including information on whether each symbol is connected to another of the symbols;
  providing a condition in memory for each of said symbols corresponding to components that satisfy the specification or corresponding to operational unit of the components $K_i$ that satisfy the specification;
  using a processor to determine, by evaluation of the associated condition whether each symbol in the original master diagram in the memory will be taken over into the target engineering diagram or whether it will be omitted in the target master diagram or whether it will be replaced with another symbol to determine whether the condition for each symbol is met and evaluating each particular symbol to determine if it would be unconnected at least at one connection point if one or more other symbol that is directly or indirectly connected to the particular symbol in the master diagram is omitted in the target engineering diagram and omitting the particular symbol from the target engineering diagram if the processor determines that the symbol would be unconnected by not also taking over the other symbol or symbols; and
  entering the symbols in the target engineering diagram for which the condition is met.

16. The process in accordance with claim 15, wherein the step of using the processor comprises:
  converting the data in memory comprising the original master diagram into a form in which each group of symbols that is coherent due to connections, is translated into a system of Boolean expressions, wherein the terms of the Boolean expressions contain the conditions associated with the symbols, and serially connected symbols or symbol groups are translated by AND linkage of the corresponding terms, and parallel-connected symbols or symbol groups are translated by OR linkage of the corresponding terms;
  partially evaluation said Boolean expressions by the processor by substituting the values for the variables in the conditions and systematically simplifying the Boolean expressions; and
  retranslating the remaining nontrivial Boolean expressions into a corresponding target engineering diagram.

17. The process in accordance with claim 15, wherein the step of using the processor comprises:
  translating the original master diagram into a graph, with links corresponding to each symbol;
  determining whether a link is eliminated or not and whether the two nodes connected by the link are identified with one another or not or whether nodes with exactly one information accepting link and one information providing link are omitted, the two links being integrated into a single link; and
  the remaining nontrivial partial graphs are retranslated into corresponding symbol arrangements for the target engineering diagram.

* * * * *